(12) United States Patent
Schuh et al.

(10) Patent No.: US 9,825,282 B2
(45) Date of Patent: Nov. 21, 2017

(54) STORAGE ELEMENT AND PROCESS FOR THE PRODUCTION THEREOF

(75) Inventors: Carsten Schuh, Baldham (DE); Thomas Soller, Landau/Isar (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 14/239,142

(22) PCT Filed: Sep. 3, 2012

(86) PCT No.: PCT/EP2012/067106
§ 371 (c)(1),
(2), (4) Date: Feb. 16, 2014

(87) PCT Pub. No.: WO2013/045208
PCT Pub. Date: Apr. 4, 2013

(65) Prior Publication Data
US 2014/0220443 A1    Aug. 7, 2014

(30) Foreign Application Priority Data
Sep. 27, 2011  (DE) .................. 10 2011 083 537

(51) Int. Cl.
| | | |
|---|---|---|
| *H01M 4/131* | (2010.01) | |
| *H01M 4/1391* | (2010.01) | |
| *H01M 4/38* | (2006.01) | |
| *H01M 4/52* | (2010.01) | |
| *H01M 4/80* | (2006.01) | |
| *H01M 10/39* | (2006.01) | |
| *H01M 4/02* | (2006.01) | |

(52) U.S. Cl.
CPC ......... *H01M 4/131* (2013.01); *H01M 4/1391* (2013.01); *H01M 4/38* (2013.01); *H01M 4/523* (2013.01); *H01M 4/801* (2013.01); *H01M 4/803* (2013.01); *H01M 10/39* (2013.01); *H01M 2004/021* (2013.01)

(58) Field of Classification Search
CPC ..................... H01M 4/131; H01M 4/1391
USPC .................................................. 429/221
See application file for complete search history.

(56) References Cited

U.S. PATENT DOCUMENTS

| | | | | |
|---|---|---|---|---|
| 3,615,760 A | * | 10/1971 | Williams | ............... C04B 35/18 |
| | | | | 257/E23.009 |
| 5,002,608 A | * | 3/1991 | Fujiwara | ............... C09C 1/0015 |
| | | | | 106/415 |
| 5,217,822 A | | 6/1993 | Shimizu | |
| 6,905,796 B2 | * | 6/2005 | Ishida | ..................... H01M 4/13 |
| | | | | 429/209 |
| 2004/0043292 A1 | | 3/2004 | Christian et al. | |

(Continued)

FOREIGN PATENT DOCUMENTS

| | | |
|---|---|---|
| CN | 1591955 A | 3/2005 |
| CN | 1679190 A | 10/2005 |

(Continued)

*Primary Examiner* — Patrick Ryan
*Assistant Examiner* — Victoria Lynch
(74) *Attorney, Agent, or Firm* — Beusse Wolter Sanks & Maire

(57) ABSTRACT

A storage element for a solid electrolyte battery is provided, having a main member of a porous ceramic matrix in which particles, that are made of a metal and/or a metal oxide and jointly form a redox couple, are embedded, the particles having a lamellar shape.

20 Claims, 1 Drawing Sheet

(56) References Cited

U.S. PATENT DOCUMENTS

| | | |
|---|---|---|
| 2004/0202924 A1 | 10/2004 | Bai |
| 2005/0008874 A1* | 1/2005 | Wang .................. C03B 19/06 428/426 |
| 2005/0069756 A1 | 3/2005 | Gilles et al. |
| 2006/0204830 A1 | 9/2006 | Ovshinsky |
| 2008/0280141 A1* | 11/2008 | Dobbs .................. B82Y 30/00 428/403 |
| 2009/0191462 A1 | 7/2009 | Matsui et al. |
| 2009/0197172 A1* | 8/2009 | Inda .................. H01M 4/0471 429/209 |
| 2010/0112443 A1* | 5/2010 | Blomgren .......... H01M 4/1391 429/221 |
| 2010/0297531 A1* | 11/2010 | Liu ...................... B01D 61/38 429/498 |
| 2011/0097623 A1* | 4/2011 | Marinis, Jr. ......... H01M 2/0285 429/163 |
| 2011/0177407 A1 | 7/2011 | Majima et al. |
| 2011/0223493 A1* | 9/2011 | Christian ................ H01M 4/06 429/344 |
| 2011/0318641 A1* | 12/2011 | Sugiura .................. C01G 51/42 429/231.8 |
| 2012/0058396 A1 | 3/2012 | Harter |
| 2013/0323593 A1* | 12/2013 | Becker ................ H01M 4/0402 429/217 |

FOREIGN PATENT DOCUMENTS

| | | |
|---|---|---|
| CN | 101481109 A | 7/2009 |
| CN | 101908637 A | 12/2010 |
| CN | 102164652 | 8/2011 |
| CN | 102164652 A | 8/2011 |
| DE | 4129553 A1 | 3/1992 |
| EP | 1513214 A1 | 3/2005 |
| EP | 2335807 A1 | 6/2011 |
| WO | 9819351 A2 | 5/1998 |
| WO | 2011019455 A1 | 2/2011 |
| WO | 2012021269 A1 | 2/2012 |
| WO | 2012177356 A1 | 12/2012 |

* cited by examiner

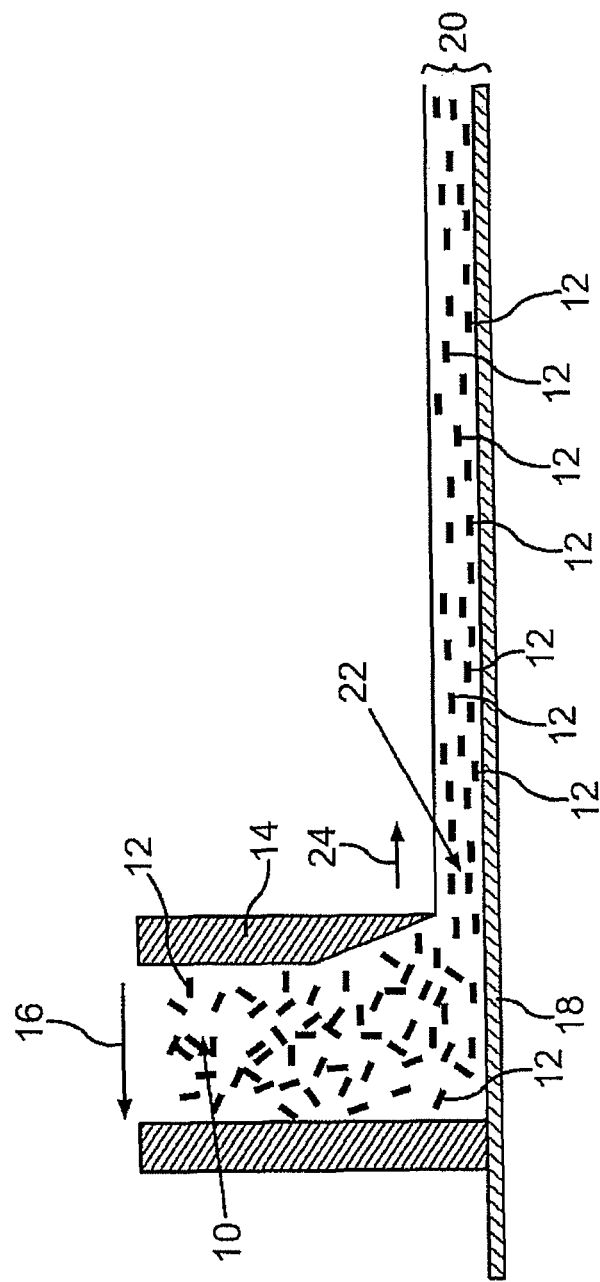

STORAGE ELEMENT AND PROCESS FOR THE PRODUCTION THEREOF

CROSS REFERENCE TO RELATED APPLICATIONS

This application is the US National Stage of International Application No. PCT/EP2012/067106 filed Sep. 3, 2012, and claims the benefit thereof. The International Application claims the benefit of German Application No. DE 10 2011083537.7 filed Sep. 27, 2011. All of the applications are incorporated by reference herein in their entirety.

FIELD OF INVENTION

The invention relates to a storage element for a solid electrolyte battery and also to a process for producing such a storage element.

BACKGROUND OF INVENTION

Solid electrolyte batteries are based on the principle of a solid electrolyte fuel cell, which is supplemented by additional ceramic storage bodies for use as a battery. Metal or metal oxide particles are incorporated in a ceramic matrix of these storage bodies. To draw energy from this battery, the metal particles are electrochemically converted to the corresponding oxides using oxygen, in which case the energy which is released can be drawn as electrical energy at the tapping poles of the battery. To recharge a battery of this type, the component parts of the battery which are equivalent to a solid oxide fuel cell are operated in electrolysis mode, so that the electrical energy which is supplied forms hydrogen, which can reduce the metal oxides back to the corresponding metals.

The accessibility of the incorporated metal or metal oxide particles and also the active surface area thereof are of particular importance for the capacity and also the charging and discharging characteristics of such a battery. At present, substantially spherical or ellipsoidal metal particles having a median grain size d50 of less than 10 µm are commonly used. However, particles of this type have a high reactivity and thus tend toward rapid mutual sintering at the high operating temperatures of a solid electrolyte battery. By virtue of this sintering, the majority of the active surface area of the particles is lost, and therefore the storage elements of a battery designed in such a way exhibit rapid aging.

SUMMARY OF INVENTION

The present invention is therefore based on an object of specifying a storage element which has a particularly high storage capacity, good discharging characteristics and at the same time long-term stability both in the charging/discharging cycle and in standby mode. The invention is furthermore based on an object of providing a process which makes it possible to produce such a storage element.

This object is achieved by a storage element described herein and also by a process having the features described herein.

A storage element of this type for a solid electrolyte battery comprises a main body made of a porous ceramic matrix in which particles of a metal and/or a metal oxide which together form a redox pair are incorporated. According to aspects of the invention, it is provided that the particles have a platelet-like form. In contrast to the spherical or ellipsoidal shape of the particles which is known from the prior art, platelet-like metal or metal oxide particles have a particularly beneficial surface area to volume ratio. This makes it possible to realize particularly high packing densities and therefore particularly high storage capacities. Storage elements comprising platelet-like metal or metal oxide particles are furthermore distinguished by a particularly low required intergranular depth of penetration for the redox reaction compared to spherical particles of identical volume, which considerably improves the reaction kinetics during the charging and discharging operation for a battery having such a storage element. The flattened particle shape additionally facilitates the mutual separation of the individual metal or metal oxide particles, which reduces the mutual sintering of these particles during operation. This improves both the usable capacity of the storage element and also the long-term stability thereof.

The particles preferably have an aspect ratio—i.e. a ratio relating to the lengths of the long and short main axes thereof—of more than 10, and therefore a particularly good volume to surface area ratio can be achieved.

The median grain size d50 of the particles of the metal and/or the metal oxide which are used is preferably 10-20 µm. The grain size d90, i.e. the size which is not exceeded by 90% of the particles, is in this case preferably less than 60 µm.

It is furthermore expedient if the particles are oriented with respect to a preferential direction, in order to achieve particularly dense packing and a low inclination toward sintering. In a further configuration of the invention, the particles are formed from iron and/or an iron oxide, in particular micaceous iron oxide. The use of micaceous iron oxide in particular is advantageous since, on account of its crystal structure, it can be brought into the desired platelet-like shape without complex machining.

The matrix of the storage element itself preferably comprises sintered ceramic particles, which expediently have a median grain size d50 of less than 1 µm. Since the ceramic particles have a considerably smaller form than the metal particles, the metal particles are coated over a large area by the ceramic particles, and therefore contact between the metal particles themselves, which might later lead to sintering, scarcely occurs. At the same time, the surface area of the metal particles remains substantially accessible, however, and therefore reactive surface area is scarcely lost.

The ceramic particles preferably comprise a redox-inert material, in particular of $Al_2O_3$, MgO or $ZrO_2$. It goes without saying that it is also possible to use other oxidic ceramics or else ceramics on a carbide or nitride basis, provided that they do not tend toward redox reactions under the electrochemical conditions in a solid electrolyte battery.

The invention further relates to a process for producing a storage element for a solid electrolyte battery, in which a slip of ceramic particles and particles of a metal and/or a metal oxide which together form a redox pair is provided and shaped to form a green body, which is subsequently sintered. According to aspects of the invention, it is provided that platelet-like particles of metal and/or metal oxide are used. As already outlined with reference to the storage element according to aspects of the invention, platelet-like particles of this type bring about a lower required intragranular depth of penetration for the redox reaction than spherical or ellipsoidal particles of identical volume, as a result of which the reaction kinetics are improved considerably compared to conventional storage elements. At the same time, the mutual separation of the individual metal/metal oxide particles can be ensured considerably more easily by this particle shape, and therefore the tendency toward sintering decreases and the long-term stability increases. Furthermore, a surface area to volume ratio which is more favorable than that in the case of spherical particles is achieved, which in turn results in a higher achievable packing density of metal particles in the storage body. The process according to the invention also makes it possible to achieve large-scale, reproducible, flexible and inexpensive production of storage elements.

In a preferred embodiment, the green body is shaped by extrusion or pressing. This makes it possible to achieve particularly simple and rapid production of the green body.

As an alternative thereto, in order to shape the green body, firstly a green sheet can be produced on a support by sheet casting. The support is subsequently removed from the green sheet and a plurality of green sheet portions are stacked to form the green body and subsequently laminated and debindered. The layered structure of the green body from individual sheet portions makes it possible to construct further-textured structures, for example by using different slip compositions for individual green sheet portions. It is thereby possible to achieve, for example, gradients of pore size, pore density, grain size or chemical composition of the green body and therefore of the resulting storage element.

It is preferable that micaceous iron oxide particles having a median grain size d50 of 10-20 µm and a grain size d90 of less than 60 µm and also an aspect ratio of more than 10 are used as particles of the metal and/or metal oxide, since it is possible in this way to achieve a particularly good ratio between the overall volume of the storage body and the active surface area, combined with high long-term stability. Particles of $Al_2O_3$, MgO or $ZrO_2$ having a median grain size d50 of less than 1 µm are preferably used as ceramic particles. Since the ceramic particles are considerably smaller than the metal or metal oxide particles, the metal oxide particles are stabilized by the ceramic and prevented from making mutual contact, and therefore they can be scarcely sintered to one another. At the same time, however, the ceramic particles are small enough not to significantly limit the active surface area of the metal or metal oxide particles.

BRIEF DESCRIPTION OF THE DRAWINGS

Hereinbelow, the invention and embodiments thereof will be explained in more detail with reference to the drawing.

The single FIGURE in this respect shows a schematic illustration of the sheet casting step during the production of an exemplary embodiment of a storage element according to the invention by means of an exemplary embodiment of a process according to the invention.

DETAILED DESCRIPTION OF INVENTION

To produce a storage element for a solid electrolyte battery, firstly provision is made of a slip 10 of ceramic particles, for example aluminum oxide, magnesium oxide or zirconium oxide, to a proportion of platelet-like micaceous iron oxide particles 12. The grain size d50 of the ceramic particles is in this case preferably approximately 1 µm, and the median grain size d50 of the micaceous iron oxide particles 12 is 10-20 µm. On account of its crystal structure, micaceous iron oxide can be provided in a particularly simple manner in the form of platelet-like particles. These have a particularly beneficial surface area to volume ratio, and therefore it is possible to realize a storage body having a particularly high active metal surface area.

By means of a sheet casting apparatus 14, which is moved in the direction of the arrow 16 over a support sheet 18, firstly a green sheet 20 is produced from the slip. In the process, the slip passes onto the sheet surface through a discharge gap 22 in the sheet casting apparatus 14. Owing to the relative movement between the sheet casting apparatus 14 and the support sheet 18, shear forces arise in the direction of the arrow 24 in the slip film which forms on the sheet surface. Owing to this shearing, the micaceous iron oxide particles 12 are oriented in a preferential direction.

After sheet casting, the green sheet 20 can be detached from the support 18 and split into corresponding portions. The green sheet portions are subsequently stacked to form a green body corresponding to the shape of the storage element to be formed, until the desired height has been reached. This sheet stack is subsequently laminated and debindered and then sintered.

In this process, the ceramic particles of the slip 10 in particular sinter together, and in the process separate the micaceous iron oxide particles 12. At the same time, however, a sufficient number of pores remain in the ceramic matrix of the storage element so that virtually the entire surface area of the incorporated platelet-like micaceous iron oxide particles 12 is accessible to reaction gases. What is thus provided as a whole is a storage element for a solid electrolyte battery which has a particularly high active surface area and therefore has particularly good charging and discharging kinetics. On account of the platelet-like shape of the micaceous iron oxide particles 12, the latter are separated from one another in the matrix and therefore do not tend to sinter together during operation of a solid electrolyte battery having such a storage element. Both the long-term stability and also the storage capacity of a storage element produced in this way are therefore particularly good.

The invention claimed is:

1. A storage element for a solid electrolyte battery, comprising
   a main body made of a porous ceramic matrix in which particles of a metal and/or a metal oxide are incorporated and occupy a volume that is less than a volume of the ceramic matrix and which together form a redox pair,
   wherein the particles have a platelet-like form with an aspect ratio of more than 10, wherein the aspect ratio is a ratio of a long axis and a short axis of the particles.

2. The storage element as claimed in claim 1, wherein the particles have a median grain size d50 of 10 to 20 µm.

3. The storage element as claimed in claim 1, wherein the particles have a grain size d90 of less than 60 µm, wherein grain size d90 is a grain size that is not exceeded by 90% of the particles.

4. The storage element as claimed in claim 1, wherein the particles are oriented with respect to a preferential direction to enhance a packing density of the particles and reduce sintering of the particles.

5. The storage element as claimed in claim 1, wherein the particles comprise iron and/or an iron oxide.

6. The storage element as claimed in claim 1, wherein the matrix comprises sintered ceramic particles distinct from the particles of the metal and/or the metal oxide and wherein a portion of a surface area of the particles of the metal and/or the metal oxide is coated with the sintered ceramic particles to prevent the particles of the metal and/or the metal oxide from making mutual contact.

7. The storage element as claimed in claim 6, wherein the ceramic particles have a median grain size d50 of less than 1 µm.

8. The storage element as claimed in claim 6, wherein the ceramic particles comprise a redox-inert material.

9. A process for producing a storage element for a solid electrolyte battery, comprising:
  shaping a slip of ceramic particles and particles of a metal and/or a metal oxide distinct from the ceramic particles which together form a redox pair to form a green body, which is subsequently sintered, and
  separating the particles of metal and/or metal oxide based on sintering the ceramic particles together,
  wherein platelet-like particles of metal and/or metal oxide are used.

10. The process as claimed in claim 9, wherein the green body is shaped by:
  moving a sheet casting apparatus in a first direction over a support sheet;
  inducing shear forces on the particles of the metal and/or the metal oxide in the slip in a second direction opposite to the first direction based on the moving the sheet;
  passing the particles of the metal and/or the metal oxide in the slip through a discharge gap between the moving sheet and the support sheet; and
  orienting the particles of the metal and/or the metal oxide in a preferential direction.

11. The process as claimed in claim 9, wherein, in order to shape the green body, firstly a green sheet is produced on the support sheet by sheet casting, the support sheet is subsequently removed and a plurality of green sheet portions are stacked to form the green body and subsequently laminated and debindered.

12. The process as claimed in claim 9, wherein micaceous iron oxide particles having a median grain size d50 of 10 to 20 μm and a grain size d90 of less than 60 μm and also an aspect ratio of more than 10 are used as particles of the metal and/or metal oxide.

13. The process as claimed in claim 9, wherein particles of $Al_2O_3$, MgO or $ZrO_2$ having a median grain size d50 of less than 1 μm are used as ceramic particles.

14. The storage element as claimed in claim 5, wherein the iron oxide comprises micaceous iron oxide.

15. The storage element as claimed in 8, wherein the redox-inert material comprises $Al_2O_3$, MgO or $ZrO_2$.

16. A storage element for a solid electrolyte battery, comprising
  a main body made of a porous ceramic matrix comprising ceramic particles and particles of a metal and/or a metal oxide which together form a redox pair are incorporated,
  wherein the particles of the metal and/or the metal oxide have a platelet-like form and a median grain size d50 of at least 10 μm;
  and wherein a portion of a surface area of the particles of the metal and/or the metal oxide is coated with the ceramic particles to prevent sintering of the particles of metal and/or metal oxide.

17. The storage element as claimed in claim 16, wherein the ceramic particles are sintered together and form pores over the surface area such that the surface area is accessible to reaction gas.

18. The storage element as claimed in claim 16, wherein the ceramic particles have a median grain size d50 of less than 1 μm and wherein the median grain size d50 of the metal and/or metal oxide particles is in a range of 10 to 20 μm.

19. The storage element as claimed in claim 16, wherein the particles of the metal and/or the metal oxide have an aspect ratio of more than 10 and wherein the ceramic particles comprise a redox-inert material.

20. The storage element as claimed in claim 1, wherein particles of the metal and the metal oxide are incorporated in the porous ceramic matrix.

* * * * *